(12) United States Patent
Toebes et al.

(10) Patent No.: US 7,499,998 B2
(45) Date of Patent: Mar. 3, 2009

(54) ARRANGEMENT IN A SERVER FOR PROVIDING DYNAMIC DOMAIN NAME SYSTEM SERVICES FOR EACH RECEIVED REQUEST

(75) Inventors: John Toebes, Cary, NC (US); Bryan C. Turner, Apex, NC (US); Douglas Jay Walker, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 784 days.

(21) Appl. No.: 11/000,041

(22) Filed: Dec. 1, 2004

(65) Prior Publication Data

US 2006/0129665 A1 Jun. 15, 2006

(51) Int. Cl.
*G06F 15/13* (2006.01)
(52) U.S. Cl. ............... 709/225; 709/203; 709/204; 709/219; 709/226; 709/245; 718/105
(58) Field of Classification Search ............... 709/203, 709/204, 219, 225, 226, 245; 718/105
See application file for complete search history.

(56) References Cited

U.S. PATENT DOCUMENTS

| 6,810,411 | B1* | 10/2004 | Coughlin et al. ............ 709/203 |
| 7,020,698 | B2 | 3/2006 | Andrews et al. |
| 7,043,563 | B2* | 5/2006 | Vange et al. ............... 709/245 |
| 7,143,169 | B1* | 11/2006 | Champagne et al. ........ 709/226 |
| 7,269,162 | B1 | 9/2007 | Turner |
| 7,310,686 | B2* | 12/2007 | Uysal ...................... 709/245 |
| 2001/0025313 | A1* | 9/2001 | Feng et al. ................ 709/226 |
| 2002/0049842 | A1* | 4/2002 | Huetsch et al. ............ 709/225 |

OTHER PUBLICATIONS

Mockapetris, "Domain Names—Concepts and Facilities", Network Working Group, Request for Comments: 1034, Nov. 1987.
Mockapetris, "Domain Names—Implementation and Specification", Network Working Group, Request for Comments: 1035, Nov. 1987.
Gulbrandsen et al., "A DNS RR for specifying the location of services (DNS SRV)", Network Working Group, Request for Comments: 2782, Feb. 2000.
Calhoun et al., "Diameter Base Protocol", Network Working Group, Request for Comments: 3588, Sep. 2003.
Yokota et al., "A Proposal of DNS-Based Adaptive Load Balancing Method for Mirror Server Systems and Its Implementation", 18th International Conference on Advanced Information Networking and Applications (AINA '04) vol. 2, Mar. 29-31, 2004, pp. 1-6, Fukuoka, Japan.

(Continued)

*Primary Examiner*—Jinsong Hu
(74) *Attorney, Agent, or Firm*—Leon R. Turkevich

(57) ABSTRACT

A Domain Name System (DNS) server is configured for dynamically selecting, for a client device, a selected resolution from available resolutions, the selected resolution identifying at least one destination for the specified service. The dynamic selection of the selected resolution is based on an attribute of the client device and/or a determined attribute of the network. Hence, the selected resolution directs the client device to a specific server based on prescribed selection criteria, for example service level agreements, the location of the client device, network performance or detected congestion conditions, authentication of the user of the client device, etc. The selected resolution also can be for enforcement of load balancing policies.

44 Claims, 3 Drawing Sheets

OTHER PUBLICATIONS

Butte, "Solving the data warehouse dilemma with grid technology", IBM Global Services, Aug. 2004.

Joseph et al., "Evolution of grid computing architecture and grid adoption models", *IBM Systems Journal*, vol. 43, No. 4, 2004, pp. 624-645.

Bourbonnais et al, "Towards an information infrastructure for the grid", *IBM Systems Journal*, vol. 43, No. 4, 2004, pp. 665-688.

Anderson et al, "Global namespace for files", *IBM Systems Journal*, vol. 43, No. 4, 2004, pp. 702-722.

Tan et al., "Service domains", *IBM Systems Journal*, vol. 43, No. 4, 2004, pp. 734-755.

Lewis et al, "MyMED: A database system for biomedical research on Medline data", *IBM Systems Journal*, vol. 43, No. 4, 2004, pp. 756-767.

Peterson et al., "A Blueprint for Introduction Disruptive Technology into the Internet", *Planetlab*, PDN-02-01, Jul. 2002.

"Dynamic Domain Name Service", DyDNS, <http://www.dyns.com/services/services.htm>, Nov. 2, 2004.

"Linksys and Tzolkin Corporation Team-Up to Bundle TZO Dynamic DNS Service with Linksys' Top-Selling Cable/DSL Routers", Linksys, http://www.linksys.com/press/press.asp?prid=31>, Nov. 2, 2004.

\* cited by examiner

|  | 14a | Name | Weight | Priority |
|---|---|---|---|---|
| 14b | | W1.nowhere.com | 1 | 0 |
| 14c | | W2.nowhere.com | 2 | 0 |
| 14d | | W4.nowhere.com | 4 | 0 |
|  | | W9.nowhere.com | 9 | 0 |

| First | Weight | Second | Weight | Third | Weight | | Seq | Freq |
|---|---|---|---|---|---|---|---|---|
| W1 | 6.25% 1/16 | W2 | 13.33% 2/15 | W4 | 30.77% | 4/13 | W1W2W4W9 | 0.26% |
| | | | | W9 | 69.23% | 9/13 | W1W2W9W4 | 0.58% |
| | | W4 | 26.67% 4/15 | W2 | 18.18% | 2/11 | W1W4W2W9 | 0.30% |
| | | | | W9 | 81.82% | 9/11 | W1W4W9W2 | 1.36% |
| | | W9 | 60% 9/15 | W2 | 33.33% | 2/6 | W1W9W2W4 | 1.25% |
| | | | | W4 | 66.67% | 4/6 | W1W9W4W2 | 2.50% |
| | | TOTAL | 100% | | | | | |
| W2 | 12.50% 2/16 | W1 | 7.14% 1/14 | W4 | 30.77% | 4/13 | W2W1W4W9 | 0.27% |
| | | | | W9 | 69.23% | 9/13 | W2W1W9W4 | 0.62% |
| | | W4 | 28.57% 4/14 | W1 | 10% | 1/10 | W2W4W1W9 | 0.36% |
| | | | | W9 | 90% | 9/10 | W2W4W9W1 | 3.21% |
| | | W9 | 64.29% 9/14 | W1 | 20% | 1/5 | W2W9W1W4 | 1.61% |
| | | | | W4 | 80% | 4/5 | W2W9W4W1 | 6.43% |
| | | TOTAL | 100% | | | | | |
| W4 | 25% 4/16 | W1 | 8.33% 1/12 | W2 | 18.18% | 2/11 | W4W1W2W9 | 0.38% |
| | | | | W9 | 81.82% | 9/11 | W4W1W9W2 | 1.70% |
| | | W2 | 16.67% 2/12 | W1 | 10% | 1/10 | W4W2W1W9 | 0.42% |
| | | | | W9 | 90% | 9/10 | W4W2W9W1 | 3.75% |
| | | W9 | 75% 9/12 | W1 | 33.33% | 1/3 | W4W9W1W2 | 6.25% |
| | | | | W2 | 66.67% | 2/3 | W4W9W2W1 | 12.50% |
| | | TOTAL | 100% | | | | | |
| W9 | 56.25% 9/16 | W1 | 14.29% 1/7 | W2 | 33.33% | 2/6 | W9W1W2W4 | 2.68% |
| | | | | W4 | 66.67% | 4/6 | W9W1W4W2 | 5.36% |
| | | W2 | 28.57% 2/7 | W1 | 20% | 1/5 | W9W2W1W4 | 3.21% |
| | | | | W4 | 80% | 4/5 | W9W2W4W1 | 12.86% |
| | | W4 | 57.14% 4/7 | W1 | 33.33% | 1/3 | W9W4W1W2 | 10.71% |
| | | | | W2 | 66.67% | 2/3 | W9W4W2W1 | 21.43% |
| TOTAL 100% | | TOTAL 100% | | | | | | 100% |

Figure 2
(PRIOR ART)

ARRANGEMENT IN A SERVER FOR PROVIDING DYNAMIC DOMAIN NAME SYSTEM SERVICES FOR EACH RECEIVED REQUEST

BACKGROUND OF THE INVENTION

1. Field of the Invention

The present invention relates to domain name system (DNS) servers configured for resolving a query for a location of a requested service by a client device.

2. Description of the Related Art

Domain name system (DNS) servers have enabled users of client devices to locate services on a wide area network (such as the Internet) based on resolving the name of the service to a destination server. Each DNS server is configured for resolving a query for a specified service (i.e., a service specified in the request) according to a prescribed Domain Name System (DNS) described in the Internet Engineering Task Force (IETF) Request for Comments (RFC) 1034 and RFC 1035. For example, a conventional DNS server may be configured for responding to a query by providing a prescribed resolution, or a list of prescribed resolutions. An example of a resolution for a service (e.g., "mail.nowhere.com") is a service name (e.g., "mail.server1.nowhere.com"), or an explicit IP address (e.g., "10.10.10.10" in IPv4 format).

For example, a client device (e.g., a browser on a user's computer) may send a query to a prescribed DNS server for resolution of the service "mail.nowhere.com"; in response to the query, the DNS server can send a resolution in the form of a name (e.g., "mail.server1.nowhere.com") or an explicit IP address (e.g., "10.10.10.10"). If the DNS server returns a name, then the host needs to resolve the received name until an explicit IP address is obtained. Note that the client device also may be configured for storing (e.g, as a default entry) an IP address of a name that is recognized as a host identifier.

Hence, the resolution for the service points to a destination, based on the resolution identifying a server (e.g., if the resolution specifies an explicit IP address or a service name recognized by the client device as a host identifier) or another DNS server for more specific resolution.

The DNS server also could return a list of resolutions, where the host computer can connect to any one of the resolutions specified in the list. In this case, a client device can initially attempt to access the first resolution specified in the list; if access is unsuccessful, the client device can attempt to access the second resolution in the list, etc., until connection with one of the resolutions is successful.

A fundamental aspect of conventional DNS servers as described herein is that each of the resolutions supplied by the DNS server are stored statically within (or local to) the DNS server, resulting in "prescribed" resolutions. As described in RFC 1034 (e.g., sec. 2.4), the DNS has Domain Name Space and Resource Records, which are the specifications for a tree structure name space and data associated with the names; each node and leaf of the domain name space tree specifies a set of information, and query operations are attempts to extract specific types of information from a particular set. A query names the domain name of interest and describes the type of resource that is desired. RFC 1034 also describes name servers as holding information about the domain tree's structure and set information. Resolvers are described in RFC 1034 as programs that extract information from name servers in response to client requests.

Hence, the same prescribed resolution (or list of resolutions) is supplied to any requesting client device, regardless of any other consideration. Resolvers rely on the Domain Name Space and Resource Records stored within the name servers by retrieving the resolutions in response to the client requests. If the resolver cannot answer a query from a name server's information, the resolver will pursue the query using referrals from the name server to access other name servers. For example, one resource available on the Internet is referred to as a "NSLOOKUP" command, where a DNS server is sent a query to look up and find IP address information for a prescribed service, for example a domain name. The NSLOOKUP command enables a client device to look up information in the domain name system (DNS) according to RFC 1034, and RFC 1035. For example, sending a NSLOOKUP command for the service "yahoo.com" results in a DNS server executing the resolver to return a list of two IP addresses. Hence, a host computer eventually receives an IP address.

However, the receipt of the same prescribed resolution in the form of a prescribed IP address by multiple client devices does not necessarily result that all the client devices receiving the prescribed IP address will communicate with the same server. In particular, a destination service may employ load sharing to distribute processing across a plurality of servers, providing the appearance to the client devices that the same IP address is being used for the destination service. In particular, a gateway that is advertised as owning the prescribed IP address may forward the client request to one of a plurality of servers. This arrangement, however, is particularly disadvantageous from a network management standpoint when multiple servers are to be used in providing the request of service.

Another form of DNS services that has been implemented has been referred to as "dynamic DNS", where a router configured for providing Dynamic Host Configuration Protocol (DHCP) IP address assignment to a host network node will update a DNS server with the IP address that has been assigned to the host node. Use of dynamic DNS is particularly beneficial in cases where the host computer, for example a home computer, stores a web page and serves as a web server for a personalized domain name; in this case, the router updates the DNS server with the service name and DHCP assigned IP address. An example of dynamic DNS is provided by the service the DYDNS at the website address "www.dydns.com". In addition, commercially available Linksys® routers are configured for assigning an IP address according to DHCP, linking the assigned IP address with the user's domain name (or host identifier), and updating the DNS server with the user's assigned IP address and domain name (or host identifier).

Despite the "dynamic DNS" feature offered by devices such as the Linksys® routers, the IP address and corresponding domain name (or host identifier) are still stored by the external device (namely the Linksys® router or the service DYDNS) without any involvement by the DNS server; in other words, the updating technology is implemented external to the DNS server. Hence, the DNS server still relies on a static resolution based solely on retrieval of stored resolutions. Consequently, the DNS server returns the same resolution in response to any query for the specified service, regardless of the nature of the query. Hence, each host node sending a query to a DNS server will receive the same resolution, regardless of identity, location of the host node.

In other words, the mappings between a service name and a destination (e.g., destination host identifier or IP address) that are used to create a resolution are statically configured or programmatically defined by a source that is external to the DNS server: the source is solely responsible for the mapping that creates the resolution accessed by the DNS server.

An additional problem is that the aforementioned DNS servers do not provide any information in the list of resolutions that enable implementation of any policies associated with priority, preference, or load balancing. In particular, the list of resolutions did not provide any information identifying the relative capacity of the respective servers identified in the respective resolutions.

Assume a list of resolutions specifies four servers, and one server has ten times the capacity (10C) of the remaining three servers (1C), such that the total capacity is thirteen units of capacity (13C). In this case, it would be desirable for a given client device to access the larger server 10 out of 13 times (76.9 percent of the time), and any one of the remaining three servers 1 out of 13 times (7.7 percent of the time) in order to optimize load balancing between the servers.

This desirability for implementing a form of load balancing resulted in "DNS SRV", as specified in RFC 2782, entitled "A DNS RR for specifying the location of services (DNS SRV)." RFC 2782 describes "SRV records" that are generated by a DNS server in response to a DNS query. FIG. 1 is a diagram illustrating a list 10 of resolutions 12 according to RFC 2782. Each resolution 12 includes not only a destination field 14 (e.g., a server name or IP address), but also a corresponding weight 16 and priority 18. The weight 16 and priority 18 enable a client device to participate in performing load balancing based on applying a randomized selection.

In particular, the weight 16 specifies the corresponding capacity (e.g., "1", "2", "4", "9") of the server (e.g., W1, W2, W4, W9) identified by the destination field (e.g., "W1.nowhere.com", "W2.nowhere.com", "W4.nowhere.com","W9.nowhere.com") 14. The priority 18 specifies the order in which the DNS server prefers that the servers specified in the destination field 14 be accessed. In particular, RFC 2782 specifies that a client device must attempt to contact the "target host" (i.e., destination server) with the lowest-numbered priority it can reach; target hosts with the same priority should be tried in an order defined by the weight field.

Hence, if an SRV record 10 specifies multiple resolutions 12, the DNS server relies on the client devices to perform load balancing by selecting between the servers using a random selection algorithm. In other words, the client device is expected to randomly choose the server between the servers based on the specified weight and priority.

Hence, in contrast to conventional DNS, a client having received a SRV record 10 is expected to first select a server from the list of servers having the lowest priority 18; an alternate server having a higher priority 18 can be accessed only if the access attempts to all the servers having the lowest priority 18 were unsuccessful.

FIG. 2 is a diagram illustrating a chart 20 of probabilities 22 that client devices will select the servers 14a, 14b, 14c, and/or 14d according to a particular sequence 24. Assuming equal priority values 18, the RFC 2782 specifies that the client device is to randomly choose from the list 10 according to the weight values 16. As illustrated in FIG. 1, server 14a has a capacity of "1", the server 14b has twice the capacity of server 14a, the server 14c has four times the capacity of server 14a, and server 14d has nine times the capacity of server 14a. Hence, the total available capacity is 16 units. Hence, based on a randomized selection by a statistically significant number of client devices having received the list 10, the client devices should select, as their first access attempt 26, the servers according to the following probabilities 28: server "W1" 14a 1/16 of the time, server "W2" 14b 2/16 of the time, server "W4" 14c 4/16 of the time, and server "W9" 14d 9/16 of the time. In other words, for a given request by a client device, assuming a truly random selection by the client device, the probability that the client device will select server 14a, 14b, 14c, and 14d on its first access attempt 26 is 6.25%, 12.5%, 25%, and 56.25%, respectively.

If a client device is unsuccessful in reaching a destination 14 (e.g., 14a) specified in the list 10 in its first attempt 26, the client device should select another destination 14 (e.g., 14b) in its second access attempt 30 according to the probabilities 32 in an attempt to receive a response, based on only 15 units of capacity being available among the remaining servers. For example, assuming that the client device in the initial attempted access 26 selected the server "W1" 14a, then in selecting a server for the second request 30 the probability 32 is that the client will select the server "W2" 14b 13.33% of the time, the server "W4" 14c 26.67% of the time, and the server "W9" 14d 60% of the time. If the server from the second selection 30 is unavailable, the client device should perform a third selection 34 according to the probability 36.

Hence, the client device should select the servers according to the sequence 24 according to the corresponding probability 22. As shown in FIG. 2, the highest probability is that the client device will select the servers according to the sequence "W9 W4 W2 W1" (21.43%), and the lowest probability is that the client device will select the servers according to the sequence "W1 W2 W4 W9" (0.26%).

Hence, the probability that a given client device will access the servers 14 specified in the list of resolutions 10 is based on the relative weight values 16 (with respect to probability). Moreover, as described above, the DNS server supplies the same SRV record 10 to all the client devices. Consequently, the weights 16 in the SRV record 10 enable load balancing to be implemented by the client devices, based on the statistical distribution of requests as illustrated in FIG. 2.

However, the method by which the client devices, as a statistical population, perform load balancing is based solely upon implementation of randomization functions in each of the client devices in how each client selects a server. In addition, the same mapping will be returned to every device regardless of any other consideration. Hence, there is an implied trust by the DNS SRV server that the client will apply the DNS SRV algorithm, using random selection, in order to accomplish load balancing. Hence, the choice of load balancing is based solely on reliance of the client device interpreting how to resolve the name according to the list returned.

Hence, any failure in the randomness applied by a group of clients may introduce a bias that affects the random distribution required for even load balancing. In addition, the aforementioned arrangement does not consider that client devices may be configured to disregard random selection, for example in the case of a user that decides to select a server solely based on capacity, thereby disregarding the intended randomness requirements of the client devices to ensure even load balancing.

In summary, there are only two mechanisms for implementing load balancing: relying on client devices to perform random selection of available servers, or an external resource changing the DNS mapping. Although an external resource may be configured for removing from the DNS mapping the identities of failed servers with the respective identities of replacement servers, or change the DNS mappings based on server capacity and performance, the DNS server has no involvement whatsoever in selecting a destination in response to a query; rather, the DNS server merely supplies the stored resolutions associated with the specified service (i.e., the service specified in the query).

SUMMARY OF THE INVENTION

There is a need for an arrangement that enables a DNS server to control destinations accessed by client devices for execution of network-based services.

There also is a need that enables a DNS server to provide a resolution to a DNS query for a specified service, having been sent by a client device, where the resolution is selected based on attributes that optimize the execution of the specified service on behalf of the client device.

There also is a need for an arrangement that enables a DNS server to provide to a client device a resolution that directs the client device to a specific server based on prescribed selection criteria, for example service level agreements, the location of the client device, network performance or detected congestion conditions, authentication of the user of the client device, etc.

These and other needs are attained by the present invention, where a Domain Name System (DNS) server is configured for dynamically selecting, for a client device, a selected resolution from a plurality of available resolutions, the selected resolution identifying at least one destination for the specified service, the dynamic selection of the selected resolution based on at least any one of an attribute of the client device and a determined attribute of the network.

One aspect of the present invention provides a method in a Domain Name System (DNS) server. The method includes receiving via a network a request from a client device for at least one destination that provides in the network a specified service. The method also includes dynamically selecting, for the client device, a selected resolution from a plurality of available resolutions, the selected resolution identifying at least one destination for the specified service, the dynamic selection of the selected resolution based on at least any one of an attribute of the client device and a determined attribute of the network. The method also includes outputting onto the network the resolution for delivery to the client device.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein:

FIG. 1 is a diagram illustrating a conventional (PRIOR ART) list of resolutions, output by a DNS server, that includes weight and priority values.

FIG. 2 is a (PRIOR ART) diagram illustrating probabilities that a client device receiving a DNS SRV record will select destination servers in a particular sequence.

BEST MODE FOR CARRYING OUT THE INVENTION

Figure 3:
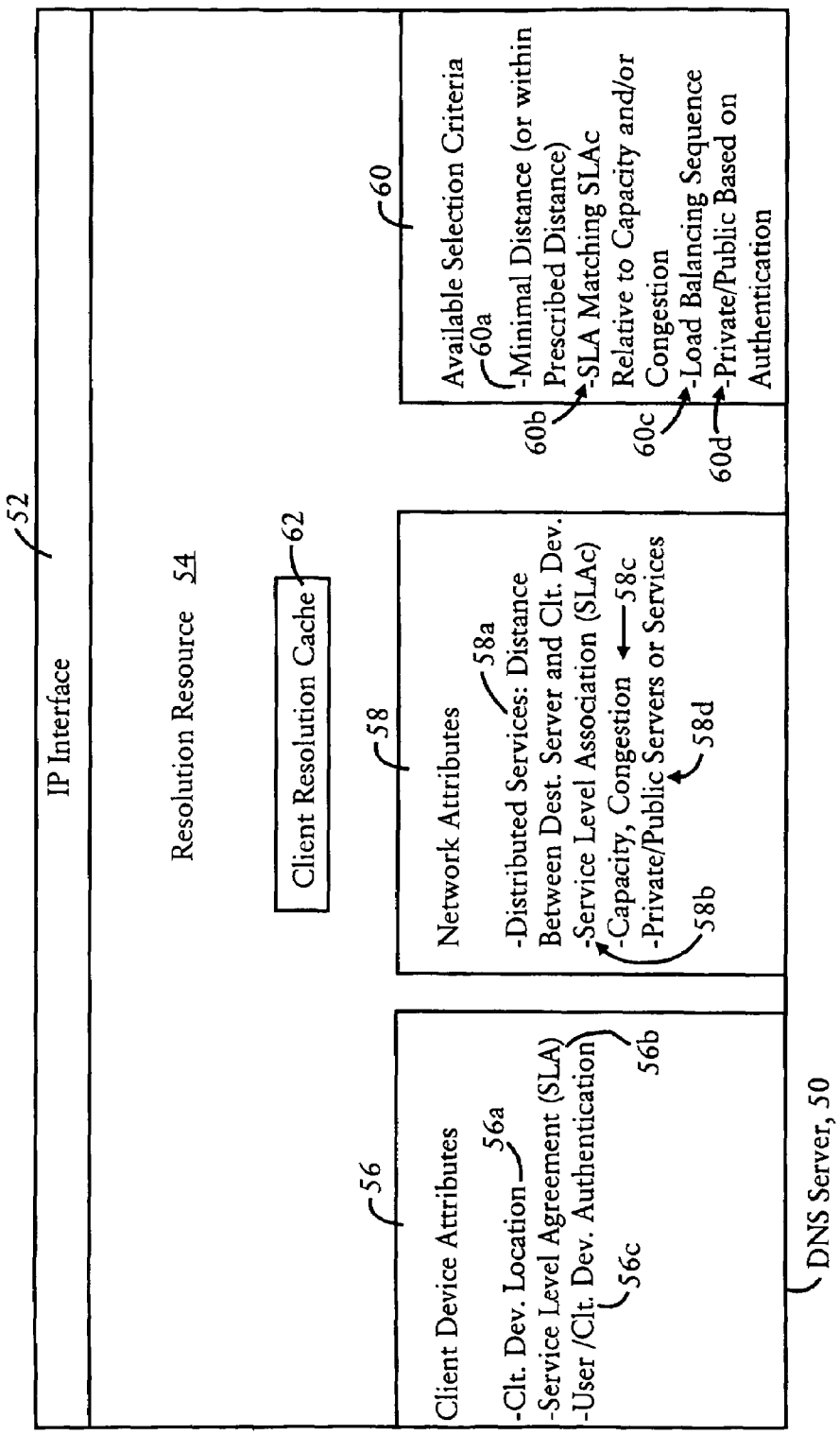
FIG. 3 is a diagram illustrating a DNS server according to an embodiment of the present invention.

FIG. 3 is a diagram illustrating a Domain Name System (DNS) server 50, according to an embodiment of the present invention. The DNS server 50 includes an IP interface 52, and a resolution resource 54. The IP interface 52 is configured for receiving, via a network, a DNS request from a client device (not shown). The DNS request from the client device includes typically the IP address of the client device, and a specified service. Hence, the DNS request is for at least one destination that provides within the network the specified service.

The resolution resource 54 is configured for receiving the DNS request from the IP interface 52, and dynamically selecting a resolution, or a list of resolutions, that satisfies the DNS request. Unlike prior DNS servers, however, the resolution resource 54 does not merely retrieve stored resolutions. Rather, the resolution resource 54 dynamically selects a selected resolution in order to identify a destination that is most appropriate for the client device.

According to the disclosed embodiment, the resolution resource 54 is configured for dynamically selecting, for the client device, a selected resolution from a plurality of available resolutions. In particular, the resolution resource 54 includes a client device attributes module 56 configured for identifying client device attributes, a network attributes module 58 configured for identifying network attributes, and an available selection criteria module 60 configured for identifying criteria available for selecting a resolution from available resolutions. The resolution resource 54 also includes a client resolution cache 62. As described in further detail below, the resolution resource 54 is configured for dynamically selecting a selected resolution for the DNS query based on applying client device attributes 56 and/or network attributes 58 to the available selection criteria 60 in order to dynamically select a resolution.

Consequently, the resolution resource 54 applies available selection criteria 60 to available client device attributes 56 and/or network attributes 58 in order to identify a selected resolution which is the "most appropriate" for the client device. It will become readily apparent that numerous selection criteria and attributes may be utilized in identifying the most appropriate resolution for a given client device; hence, the description herein with respect to different attributes and selection criteria are only by way of illustration, and are not intended to limit the disclosed embodiment to any attributes or selection criteria.

For example, the client device attributes module 56 may identify attributes such as client device location 56a, service level agreement (SLA) 56b, or user/client device authentication 56c. The client device location attribute 56a may be particularly relevant in identifying the closest server relative to the client device location; the service level agreement (SLA) attribute 56b may be relevant in distinguishing different service types or destinations based on service-level agreement, where a user having subscribed to a premium service may be granted access to a higher capacity destination server, as opposed to a subscriber with a minimal service agreement being limited to limited-capacity destination servers.

In addition, the user or client device authentication attribute 56c may be relevant with respect to corporate or relationship-based services in terms of directing a client device to an external destination (i.e., external to a corporate intranet) or an internal destination (i.e., internal to the corporate intranet), based on whether the client device and the destination service have an established trust relationship. Additional details illustrating location-based services are illustrated, for example, in commonly-assigned, application Ser. No. 09/908,578, filed Jul. 20, 2001, entitled "INTEGRATION OF PRESENCE SERVICES WITH A NETWORK ENABLED TELEPHONY DEVICE", issued on Sep. 11, 2007 as U.S. Pat. No. 7,269,162. the disclosure of which is incorporated in its entirety herein by reference.

The network attributes module 58 identifies the network-based characteristics utilized by the resolution resource 54 in identifying a destination for the specified service that is most appropriate for the client device issuing the DNS request. For example, in the case of distributed services, the distance attribute 58a identifies distance between a destination server and a client device (based on the client device location attribute 56a) to identify a minimal distance. The term "distance" as used herein can refer to attributes of the network, which are detectable by the elements of the network, that establish a quantifiable relationship, for example hop count, latency, bandwidth, lost packets, line noise, congestion, wireless signal strength, supplied GPS coordinates, etc.

In addition, the Service Level Association (SLAc) attribute 58b may be relevant in associating a given service level for the client device 56b with the corresponding server providing the specified service in the network. The capacity and congestion attribute 58c also may be relevant in identifying associated network conditions of relevant network components for selection criteria based on performance relative to a service-level agreement, load-balancing, or identifying destinations that need to be relieved of demand for service due to encountered congestion conditions. The private/public servers or services attribute 58d identifies whether a given network resource is considered publicly available on the public Internet or privately available within a restricted site (e.g., a corporate intranet).

The available selection criteria module 60 is configured for identifying the various policies that may be implemented by the resolution resource 54. For example, the available selection criteria may include identifying the minimal distance 60a between a client device location attribute 56a and a distributed services attribute 58a. In addition, the available selection criteria may include a match 60b between the SLA 56b of the client device and the SLAc 58b of a given network resource. In addition, the matching of the SLA 56b and the SLAc 58b according to the selection criterion 60b also may be relative to the capacity or congestion attribute 58c of the corresponding network resource.

Another selection criterion that may be used involves a load-balancing sequence 60c, where the resolution resource 54 selects available resolutions in a prescribed sequence (e.g., round-robin, weighted round-robin, or weighted random selection as illustrated in FIG. 2) in order to control access by client devices to distributed servers according to a prescribed load balancing policy.

Another available selection criterion includes identifying a public or private destination 60d based on authentication of the user or client device authentication attribute 56 relative to the public or private attributes 58d of the available servers or services.

Hence, the resolution resource 54 can be configured for selecting the selected resolution based on the location attribute 56a of the client device within the network, for example using a minimal distance selection criterion 60a (or within a prescribed distance) relative to a given destination server distance attribute 56a in a distributed services platform. Moreover, the distance selection criterion 60a and the service level matching selection criterion 60b may be combined in order to provide optimized locality selection for premium subscribers, and less than optimized locality-based selection of a destination server for a service-level agreement 56b specifying an economic or minimal subscription rate. Alternately, capacity-based selection criteria or authentication-based selection criteria may be used in order to identify the destination that is most appropriate for the client device based on load balancing, trusted relationships, etc.

As apparent from the foregoing, the resolution or list of resolutions may specify either an explicit IP address, or another host name for a secondary DNS server configured for providing more specific resolutions based on a different set of criteria. Multi-tiered resolutions may be deployed, where a first DNS server 50 directs the client device to a second DNS server (not shown) based on authentication (or SLA validation) of the client device; the second DNS server can then direct the client device to the appropriate destination based on locality, load sharing, etc. Hence, a first DNS server 50 may be accessed for validation of a service-level agreement attribute 56b or a client device authentication 56c; based on the validation of the client device, the DNS server 50 may direct the client device to another DNS server 50 (not shown) configured for identifying the destination server for an authenticated client device, for example based on locality or load distribution.

Figure 4:
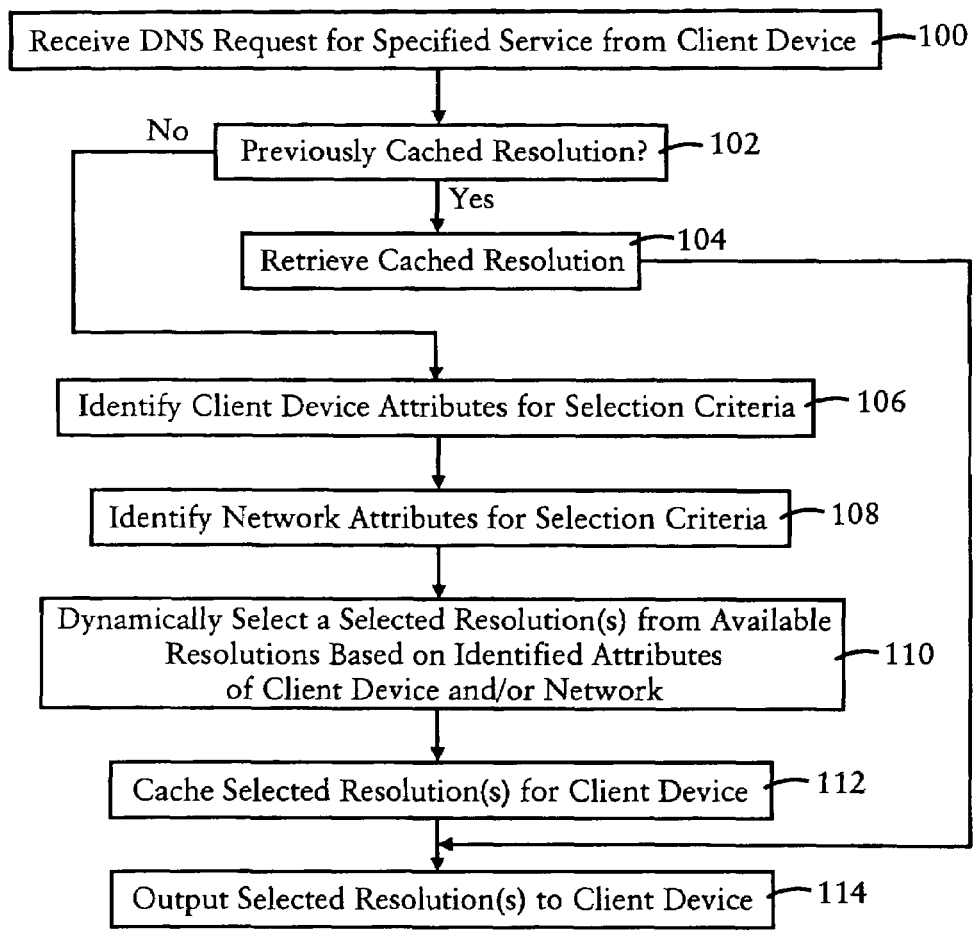
FIG. 4 is a diagram illustrating the method by the DNS server of FIG. 3 of dynamically selection a resolution based on identified attributes of the client device and/or the network, according to an embodiment of the present invention.

FIG. 4 is a diagram illustrating the method by the DNS server 50 of responding to a DNS query, according to an embodiment of the present invention. The steps described herein with respect to FIG. 4 can be implemented as executable code stored on a computer readable medium (e.g., floppy disk, hard disk, EEPROM, CD-ROM, etc.).

The IP interface 52 receives in step 100 the DNS request for the specified service from the client device. If in step 102 the resolution resource 54 determines that the DNS request from the client device has a previously cached resolution that has been stored in the client resolution cache 62, the resolution resource 54 retrieves the cached resolution in step 104 for output to the corresponding client device in step 114. Caching of the resolution is used primarily in cases where a client device will send repeated DNS queries in order to validate prior queries; as such, the client resolution cache 62 may have a prescribed expiration interval, for example one hour.

Assuming in step 102 that there is no previously cached resolution, the resolution resource 54 identifies in step 106 if there are any client device attributes 56 to be used as selection criteria. The client device attributes may be identified by the resolution resource 50 for using different means, for example the client device attributes may be supplied with the request received in step 100; alternately, the resolution resource 54 utilize the client device attributes module 56 as a data retrieval means for retrieving the attributes from remote sources, for example from an LDAP database in the case where client devices are identified and authenticated relative to an LDAP directory configured for storing subscriber attribute information.

The resolution resource 54 identifies in step 108 any network attributes 58 to be used as selection criteria, for example based on obtaining by the network attributes module 58 any network topology and/or state information from an IP router, etc. As recognized in the art, the network attributes module 58 may configured for dynamically retrieving the network attributes for a given DNS query and cached locally within the DNS server 50 for optimized performance. As such, the resolution resource 54 is configured for retrieving client device attributes 58 and/or retrieving network attributes 58, as needed.

The resolution resource 54 dynamically selects in step 110 at least one selected resolution (e.g., a host identifier or IP address) based on the client device attributes identified by the module 56 and/or the network attributes identified by the module 58 relative to the available selection criteria identified by the module 60. As described above, the selected resolutions may identify either a destination server configured for providing the specified service, or another DNS server 50 configured for identifying the destination server based on a different set of selection criteria. The resolution resource 54 caches in step 112 the selected resolutions for the client device, and outputs in step 114 the selected resolutions to the client device.

According to the disclosed embodiment, a DNS server is configured for sending to a client device the most appropriate resolution, based on client device attributes and/or network attributes, in order to provide optimized service for the client device relative to network policies.

It will become readily apparent that numerous variations a be deployed within the scope of the claims, and that the selection criteria (e.g., service level agreement, time of day, server load, distance, locality, etc.) are provided only by way of illustration.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a Domain Name System (DNS) server in a network, the method comprising:
   receiving, by the DNS server and via the network, a request from a client device for identification of at least one destination that provides in the network a specified service;
   dynamically selecting by the DNS server, for the client device, a selected resolution from a plurality of available resolutions, the selected resolution identifying at least one destination for the specified service, the dynamic selection of the selected resolution based on the DNS server determining, based on an attribute of the client device and a determined attribute of the network, whether the client device has an established service relationship authorizing the client device to access a restricted level of the specified service; and
   outputting by the DNS server onto the network the selected resolution for delivery to the client device.

2. The method of claim 1, wherein the attribute of the client device includes a location of the client device within the network, the dynamically selecting including selecting the selected resolution based on the location of the client device within the network.

3. The method of claim 2, wherein the determined attribute of the network includes an identified distance between the at least one destination and the client device, the selected resolution being selected based on the identified distance relative to other distances of the respective available resolutions.

4. The method of claim 2, wherein:
   the attribute of the client device further includes a service level associated with a user of the client device as the established service relationship;
   the dynamically selecting including selecting the selected resolution based on the location of the client device within the network and based on the service level of the user as the established service relationship.

5. The method of claim 4, wherein the attribute of the network further includes a corresponding capacity for the at least one destination, the selected resolution being selected based on the capacity of the corresponding at least one destination as the restricted level of the specified service and based on the service level being identified as authorized to obtain the specified service at the restricted level according to said capacity.

6. The method of claim 2, wherein the determined attribute of the network includes the specified service being identified as distributed among a plurality of servers in the network, the dynamically selecting including:
   identifying the one server closest to the client device; and
   selecting the selected resolution based on the corresponding at least one destination identifying the one server.

7. The method of claim 1, wherein the determined attribute of the network includes identifying the specified service as being distributed among a plurality of servers in the network, the dynamically selecting including:
   identifying the one server closest to the client device; and
   selecting the selected resolution based on the corresponding at least one destination identifying the one server.

8. The method of claim 1, wherein the determined attribute of the network includes identifying congestion conditions at the respective destinations, the selecting of the selected resolution based on the identified congestion conditions.

9. The method of claim 1, wherein the determined attribute of the network includes identifying the specified service as being distributed among a plurality of servers in the network, the dynamically selecting including selecting the selected resolution, that identifies a corresponding one of the servers, according to a prescribed load balancing sequence.

10. The method of claim 9, further comprising:
    receiving a second request from the client device, subsequent to said request from the client device, for at least one destination that provides said specified service; and
    dynamically selecting, in response to the second request, said selected resolution based on said selected resolution having been selected in response to the request.

11. The method of claim 1, wherein:
    the attribute of the client device includes whether the client device has a prescribed authentication as the established service relationship;
    the attribute of the network includes a public destination for any client device lacking the prescribed authentication and a private destination as the restricted level of the specified service for any client device having the prescribed authentication;
    the dynamically selecting including selecting the selected destination, for identification of a corresponding one of the public destination or the private destination, based on whether the client device has the prescribed authentication.

12. A Domain Name System (DNS) server in a network, the server comprising:
    an IP interface configured for receiving via the network a request from a client device for identification of at least one destination that provides in the network a specified service; and
    a resolution resource configured for dynamically selecting, for the client device, a selected resolution from a plurality of available resolutions, the selected resolution identifying at least one destination for the specified service, the dynamic selection of the selected resolution based on the resolution resource determining, based on an attribute of the client device and a determined attribute of the network, whether the client device has an established service relationship authorizing the client device to access a restricted level of the specified service;

the IP interface configured for outputting onto the network the selected resolution for delivery to the client device.

13. The server of claim 12, wherein the attribute of the client device includes a location of the client device within the network, the resolution resource configured for selecting the selected resolution based on the location of the client device within the network.

14. The server of claim 13, wherein the determined attribute of the network includes an identified distance between the at least one destination and the client device, the resolution resource configured for selecting the selected resolution based on the identified distance relative to other distances of the respective available resolutions.

15. The server of claim 13, wherein:
the attribute of the client device further includes a service level associated with a user of the client device as the established service relationship;
the resolution resource configured for selecting the selected resolution based on the location of the client device within the network and based on the service level of the user as the established service relationship.

16. The server of claim 15, wherein the attribute of the network further includes a corresponding capacity for the at least one destination, the resolution resource configured for selecting the selected resolution based on the capacity of the corresponding at least one destination as the restricted level of the specified service and based on the service level being identified as authorized to obtain the specified service at the restricted level according to said capacity.

17. The server of claim 13, wherein the determined attribute of the network includes the specified service being identified as distributed among a plurality of servers in the network, the resolution resource configured for:
identifying the one server closest to the client device; and
selecting the selected resolution based on the corresponding at least one destination identifying the one server.

18. The server of claim 12, wherein the determined attribute of the network includes identifying the specified service as being distributed among a plurality of servers in the network, the resolution resource configured for:
identifying the one server closest to the client device; and
selecting the selected resolution based on the corresponding at least one destination identifying the one server.

19. The server of claim 12, wherein the determined attribute of the network includes identifying congestion conditions at the respective destinations, the resolution resource configured for selecting the selected resolution based on the identified congestion conditions.

20. The server of claim 12, wherein the determined attribute of the network includes identifying the specified service as being distributed among a plurality of servers in the network, the resolution resource configured for selecting the selected resolution, that identifies a corresponding one of the servers, according to a prescribed load balancing sequence.

21. The server of claim 20, wherein:
the IP interface is configured for receiving a second request from the client device, subsequent to said request from the client device, for at least one destination that provides said specified service; and
the resolution resource is configured for dynamically selecting, in response to the second request, said selected resolution based on said selected resolution having been selected in response to the request.

22. The server of claim 12, wherein:
the attribute of the client device includes whether the client device has a prescribed authentication as the established service relationship;
the attribute of the network includes a public destination for any client device lacking the prescribed authentication and a private destination as the restricted level of the specified service for any client device having the prescribed authentication;
the resolution resource configured for selecting the selected destination, for identification of a corresponding one of the public destination or the private destination, based on whether the client device has the prescribed authentication.

23. A computer readable storage medium having stored thereon sequences of executable instructions for a Domain Name System (DNS) server in a network to output a resolution to a client device in response to a request, the sequences of executable instructions including instructions for:
receiving, by the DNS server and via the network, a request from a client device for identification of at least one destination that provides in the network a specified service;
dynamically selecting by the DNS server, for the client device, a selected resolution from a plurality of available resolutions, the selected resolution identifying at least one destination for the specified service, the dynamic selection of the selected resolution based on the DNS server determining, based on an attribute of the client device and a determined attribute of the network, whether the client device has an established service relationship authorizing the client device to access a restricted level of the specified service; and
outputting by the DNS server onto the network the selected resolution for delivery to the client device.

24. The medium of claim 23, wherein the attribute of the client device includes a location of the client device within the network, the dynamically selecting including selecting the selected resolution based on the location of the client device within the network.

25. The medium of claim 24, wherein the determined attribute of the network includes an identified distance between the at least one destination and the client device, the selected resolution being selected based on the identified distance relative to other distances of the respective available resolutions.

26. The medium of claim 24, wherein:
the attribute of the client device further includes a service level associated with a user of the client device as the established service relationship;
the dynamically selecting including selecting the selected resolution based on the location of the client device within the network and based on the service level of the user as the established service relationship.

27. The medium of claim 26, wherein the attribute of the network further includes a corresponding capacity for the at least one destination, the selected resolution being selected based on the capacity of the corresponding at least one destination as the restricted level of the specified service and based on the service level being identified as authorized to obtain the specified service at the restricted level according to said capacity.

28. The medium of claim 24, wherein the determined attribute of the network includes the specified service being identified as distributed among a plurality of servers in the network, the dynamically selecting including:
identifying the one server closest to the client device; and
selecting the selected resolution based on the corresponding at least one destination identifying the one server.

29. The medium of claim 23, wherein the determined attribute of the network includes identifying the specified service as being distributed among a plurality of servers in the network, the dynamically selecting including:
- identifying the one server closest to the client device; and
- selecting the selected resolution based on the corresponding at least one destination identifying the one server.

30. The medium of claim 23, wherein the determined attribute of the network includes identifying congestion conditions at the respective destinations, the selecting of the selected resolution based on the identified congestion conditions.

31. The medium of claim 23, wherein the determined attribute of the network includes identifying the specified service as being distributed among a plurality of servers in the network, the dynamically selecting including selecting the selected resolution, that identifies a corresponding one of the servers, according to a prescribed load balancing sequence.

32. The medium of claim 31, further comprising instructions for:
- receiving a second request from the client device, subsequent to said request from the client device, for at least one destination that provides said specified service; and
- dynamically selecting, in response to the second request, said selected resolution based on said selected resolution having been selected in response to the request.

33. The medium of claim 23, wherein:
- the attribute of the client device includes whether the client device has a prescribed authentication as the established service relationship;
- the attribute of the network includes a public destination for any client device lacking the prescribed authentication and a private destination as the restricted level of the specified service for any client device having the prescribed authentication;
- the dynamically selecting including selecting the selected destination, for identification of a corresponding one of the public destination or the private destination, based on whether the client device has the prescribed authentication.

34. A Domain Name System (DNS) server in a network, the server comprising:
- an IP interface configured for receiving via the network a request from a client device for at least one destination that provides in the network a specified service; and
- dynamically selecting, for the client device, a selected resolution from a plurality of available resolutions, the selected resolution identifying at least one destination for the specified service, the dynamic selection of the selected resolution based on the dynamically selecting determining, based on an attribute of the client device and a determined attribute of the network, whether the client device has an established service relationship authorizing the client device to access a restricted level of the specified service;
- the IP interface configured for outputting onto the network the selected resolution for delivery to the client device.

35. The server of claim 34, wherein the attribute of the client device includes a location of the client device within the network, the dynamically selecting configured for selecting the selected resolution based on the location of the client device within the network.

36. The server of claim 35, wherein the determined attribute of the network includes an identified distance between the at least one destination and the client device, the dynamically selecting configured for selecting the selected resolution based on the identified distance relative to other distances of the respective available resolutions.

37. The server of claim 35, wherein:
- the attribute of the client device further includes a service level associated with a user of the client device as the established service relationship;
- the dynamically selecting configured for selecting the selected resolution based on the location of the client device within the network and based on the service level of the user as the established service relationship.

38. The server of claim 37, wherein the attribute of the network further includes a corresponding capacity for the at least one destination, the dynamically selecting configured for selecting the selected resolution based on the capacity of the corresponding at least one destination as the restricted level of the specified service and based on the service level being identified as authorized to obtain the specified service at the restricted level according to said capacity.

39. The server of claim 35, wherein the determined attribute of the network includes the specified service being identified as distributed among a plurality of servers in the network, the dynamically selecting configured for:
- identifying the one server closest to the client device; and
- selecting the selected resolution based on the corresponding at least one destination identifying the one server.

40. The server of claim 34, wherein the determined attribute of the network includes identifying the specified service as being distributed among a plurality of servers in the network, the dynamically selecting configured for:
- identifying the one server closest to the client device; and
- selecting the selected resolution based on the corresponding at least one destination identifying the one server.

41. The server of claim 34, wherein the determined attribute of the network includes identifying congestion conditions at the respective destinations, the dynamically selecting configured for selecting the selected resolution based on the identified congestion conditions.

42. The server of claim 34, wherein the determined attribute of the network includes identifying the specified service as being distributed among a plurality of servers in the network, the dynamically selecting configured for selecting the selected resolution, that identifies a corresponding one of the servers, according to a prescribed load balancing sequence.

43. The server of claim 42, wherein:
- the IP interface is configured for receiving a second request from the client device, subsequent to said request from the client device, for at least one destination that provides said specified service; and
- the dynamically selecting is configured for dynamically selecting, in response to the second request, said selected resolution based on said selected resolution having been selected in response to the request.

44. The server of claim 34, wherein:
- the attribute of the client device includes whether the client device has a prescribed authentication as the established service relationship;
- the attribute of the network includes a public destination for any client device lacking the prescribed authentication and a private destination as the restricted level of the specified service for any client device having the prescribed authentication;
- the dynamically selecting configured for selecting the selected destination, for identification of a corresponding one of the public destination or the private destination, based on whether the client device has the prescribed authentication.

* * * * *